United States Patent [19]

Applebaum et al.

[11] Patent Number: 4,815,768

[45] Date of Patent: Mar. 28, 1989

[54] METHOD AND APPARATUS FOR DISCLOSURE OF PERSONAL INFORMATION

[76] Inventors: Michael I. Applebaum, 600 S. Dearborn St.; Richard E. Sayre, 899 S. Plymouth Ct., both of Chicago, Ill. 60605

[21] Appl. No.: 35,741

[22] Filed: Apr. 8, 1987

[51] Int. Cl.$^4$ .............................................. B42D 15/00
[52] U.S. Cl. ..................... 283/67; D19/10; 283/77; 283/99; 283/100; 283/114; 283/900
[58] Field of Search ............. D19/9, 10; D20/22, 27; 283/67, 77, 99, 100, 103, 113, 114, 904, 900

[56] References Cited

U.S. PATENT DOCUMENTS

| Re. 13,757 | 6/1914 | Smith | 283/100 |
|---|---|---|---|
| D. 260,153 | 8/1981 | Koltys | D19/10 |
| 1,035,997 | 8/1912 | Oppenheimer | 283/114 |
| 1,355,626 | 10/1920 | Szarat | 283/114 |
| 3,287,839 | 11/1966 | Rotwein et al. | 283/99 |
| 3,949,501 | 4/1976 | Andrews et al. | 283/77 X |

FOREIGN PATENT DOCUMENTS 2408182   7/1979   France ............................. 283/100

Primary Examiner—Paul A. Bell
Attorney, Agent, or Firm—Tilton, Fallon, Lungmus & Chestnut

[57] ABSTRACT

A method and apparatus are provided for the disclosure of medical test results or other medical or personal information, with features to maintain the security of the physician-patient relationship. An elongated card having a center portion and opposite, separable wing portions is supplied to the testing physician with patient information encoded on the center section. The physician records the pertinent medical information or test results by severing one of the wing portions to indicate the appropriate information by the presence of the remaining wing portion.

23 Claims, 4 Drawing Sheets

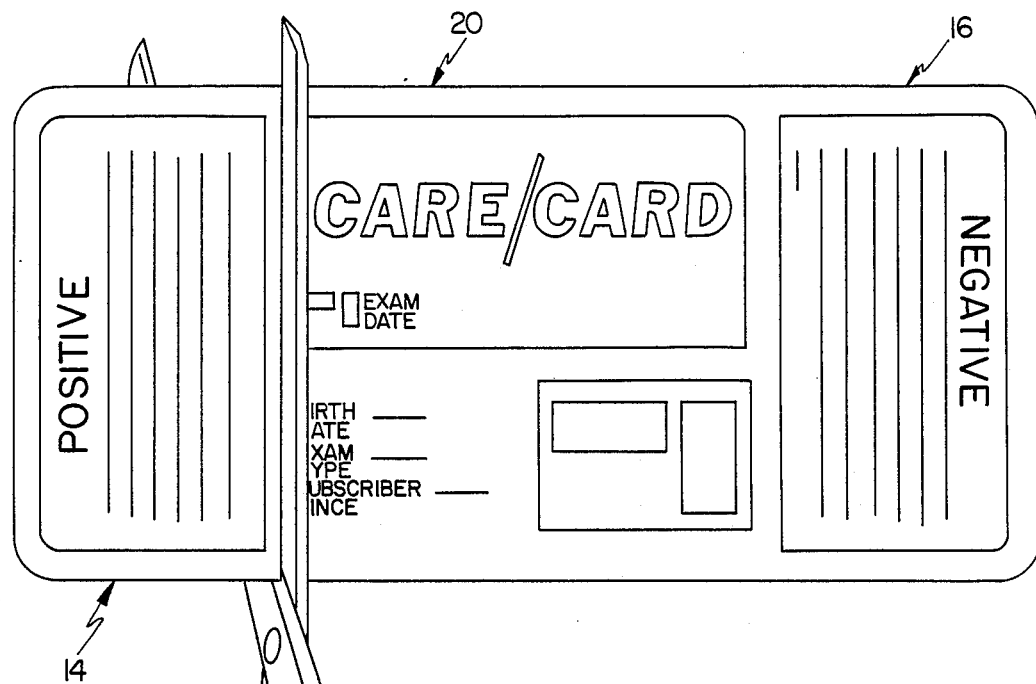
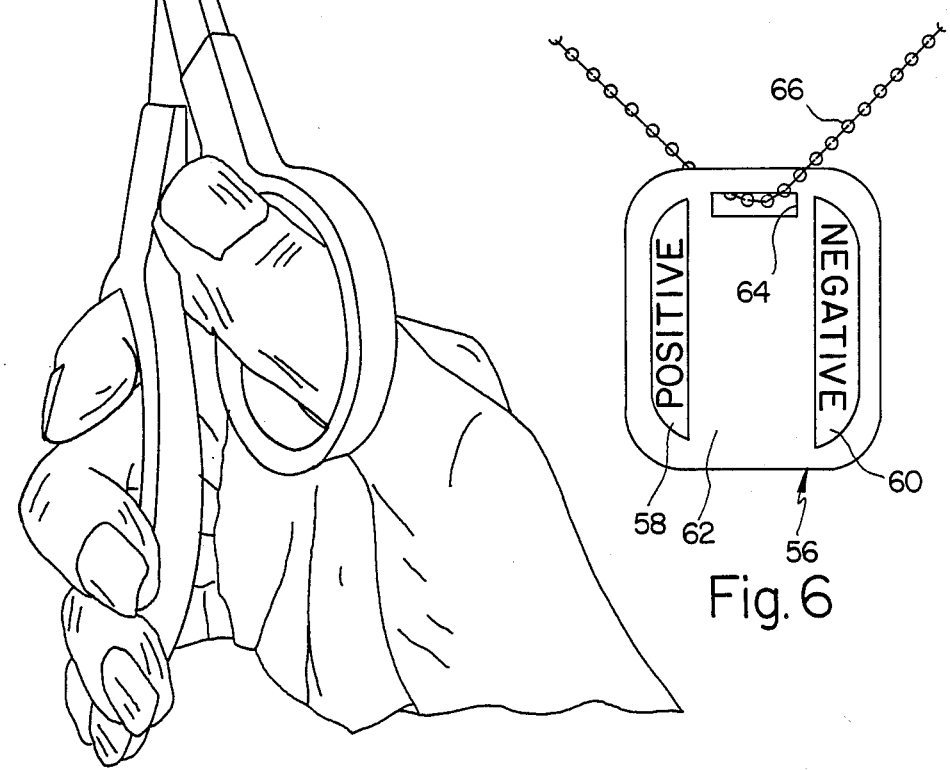
Fig. 2
Fig. 6

METHOD AND APPARATUS FOR DISCLOSURE OF PERSONAL INFORMATION

SUMMARY OF THE INVENTION

This invention relates to methods of disclosing and recording personal information such as diagnostic test results. Specifically it relates to an easily carried, tamper resistant card to be carried by the patient for the disclosure of such information to the patient and by the patient at his or her discretion. The present invention is an improvement in identification cards and similar items used for the classification of individuals according to medical or other conditions. Prior to the invention herein, such other information could be carried by the patient on a wallet-sized card, pendant or wrist band, denoting for example, blood type, drug sensitivity, or health status. A card or similar device having such information thereon, however, would be encoded with such information by its supplier, who would then have a searchable record in its files relating to the patient's condition. The medical community and the public now recognizes the need for a discrete disclosure of certain medical information which will maintain the security of the physician-patient relationship while providing the patient with a reasonably accurate and credible assessment of his or her condition to social and business acquaintances and contacts.

It has become increasingly important for individuals in modern society to be tested for dangerous communicable diseases, with the greatest concern in recent years caused by Acquired Immune Deficiency Syndrome (AIDS). At the present time tests are available to detect the presence in a patient's blood of the antibody to the virus causing AIDS; other tests have been marketed and tested which may detect the viral antigen itself. When a patient is tested for the presence of the antibody or antigen, denoting infection by the AIDS virus, the physician may communicate such a determination to the patient verbally or in writing. This communication is privileged and not subject to disclosure to the public, to the patient's employer or to any governmental agency.

With the increasing concern over AIDS, it has become necessary to provide portable, credible, accurate evidence of freedom from infection, to facilitate social contacts, employment opportunities and other relationships. Some organizations have provided testing for AIDS and other sexually communicated diseases and sold certification of negative test results in the form of wallet-sized cards to be carried by individuals found to be free of infection. These procedures present two significant drawbacks. First, the organization which conducts such a test and evaluates its results may not be subject to the physician-patient privilege and may therefore have its records of test results subject to inspection by third parties, including governmental agencies, a result clearly not intended by the patient. Secondly, the card certificate itself may be subject to alteration, lessening the credibility, reliability and security of such a certification process.

In addition to the medical devices and procedures listed above, reference may also be made to various patents in the medical information field and the fields of credit cards and identification cards as well as other cards which impart information. Among these are the following:

U.S. Design Pat. No. 260,153 to Koltis disclosing a medical information card.

U.S. Pat. No. 3,949,501 to Andrews, et al., discloses an identification card providing identification information with magnetic encoding means.

U.S. Pat. No. 3,287,839 to Rotwein, et al., discloses a credit card having removable indicia of the card's validity.

U.S. Pat. No. 1,035,997 to Oppenheimer which discloses a railroad ticket to be held by the passenger. This ticket has removable sections to indicate the time of day of a ride or similar information.

U.S. Pat. No. 1,355,626 to Szarat discloses a streetcar transfer with removable sections to identify sections of a transit line already traversed.

None of the above patents addresses the problem of confidential reporting, recording and disclosure of medical, security or other sensitive personal information solved by the present invention.

The present invention in its preferred embodiment incorporates the use of an elongated card having a center section containing identification information and information about the organization offering the service embodying the present invention. Also included are separable opposite extremity portions of the card which indicate alternative medical test results. By the removal of either of these extremity sections in the preferred embodiment, the patient's physician can indicate the patient's medical test results by the indication on the remaining extremity section. The removal of the appropriate extremity section thus leaves a wallet-sized card which is highly resistant to alteration or forgery and which indicates a test result known only to the patient and the physician's office.

It is a principal object of the invention, therefore, to provide a procedure for the reporting and recording of medical test information known only to the physician and the patient.

It is a further object of the invention to provide an information recording device which presents a neutral aspect to the patient's physician and upon which the phyician may record such information by mutilating the device.

It is a still further object of the invention to provide a medical information disclosing form that is highly resistant to alteration once the information has been indicated thereon by a physician.

It is yet another object of the invention to provide a medical information disclosure card incorporating educational information so that confusion regarding test results may be avoided.

It is yet another object of the invention to provide a secure recording format to document information given to a patient by his physician.

It is further object of the invention to provide to a recording form of the type previously described with a removable section which may be retained by the physician as part of the patient's permanent record.

It is a further object of the invention to provide for decentralized medical record keeping, to encourage thereby the voluntary testing for communicable diseases exposure.

It is a further object of the invention to provide a result disclosure card which may be used for various types of medical, security and other sensitive personal information.

It is a further object of the invention to provide a test result disclosure card wherein test results may be readily apparent by color and/or position coding the information on the card.

In the preferred embodiment of the present invention, the card used for disclosing medical information includes two alternative removable sections, corresponding to a positive or a negative test result. This can also correspond to various binary codes relating to security clearances or the like. In alternative embodiments of the present invention, additional removable sections may be used on the disclosure device, so that additional information may be conveyed by the holder of the card. A second embodiment of the card incorporates left and right side severable sections and upper and lower severable sections, so that four different results may be indicated by the removal of one of the vertical pair and one of the horizontal pair of severable card sections.

The method and apparatus described permit the recording means to be provided by one vendor, servicing many patients and physicians, without requiring that vendor to know the results of the test, but with advantages of standardization and resistance to forgery of a procedure under the control of a single vendor.

Numerous other advantages and features of the invention will become apparent from the detailed description of the preferred and alternative embodiment of the invention, from the claims and from the accompanying drawings, in which like numerals are employed to designate like parts throughout.

BRIEF DESCRIPTION OF THE DRAWINGS

Fuller understanding of the present invention may be had by reference to the accompanying drawings wherein:

FIG. 2 is a front elevation of the card in FIG. 1 showing the card being activated by having the non-applicable section removed.

FIG. 6 is a front elevation of a pendant embodying the present invention.

DETAILED DESCRIPTION

Figure 1:
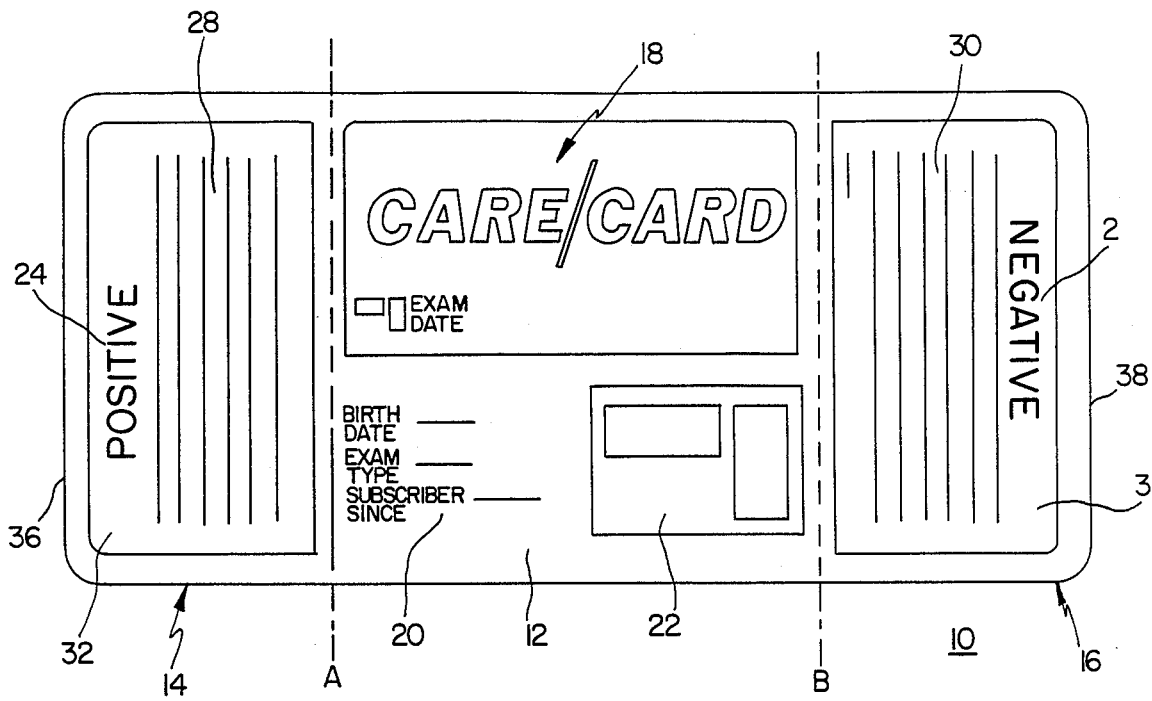
FIG. 1 is a front elevation of the information disclosing card being the preferred embodiment of the present invention.

While this invention is susceptible of embodiment in many forms, there is shown in the drawings and will be described therein a preferred embodiment and two alternative embodiments of the invention. It should be understood, however, that the present embodiments are to be considered exemplifications of the principles of the invention and are not intended to limit the spirit and scope of the invention and/or the claims to the embodiments illustrated.

Referring now to FIG. 1, the medical test result recording card is indicated generally by reference character 10. Card 10 is of unitary construction, formed of a suitable thermoplastic material commonly used in the manufacture of credit cards and other identification cards. The vertical dimension of Card 10 is approximately 2⅛ inches, being the same vertical dimension as a typical wallet-sized credit card. The length of Card 10 is approximately 4⅝ inches, being approximately 1¼ inches longer that the typical wallet-sized credit card.

As illustrated, Card 10 has three principal information bearing sections. The central section 12 is flanked on its left and right sides by lateral central sections 14 and 16, respectively. The boundary between central section 12 and left lateral section 14 is shown in this figure as severance line A and the boundary between central section 12 and right lateral section 16 is shown in this figure as severance line B. Both of these severance lines are shown in phantom indicating location only. Lateral sections 14 and 16 each measure approximtely 1¼ inches in lateral dimension.

Central section 12 is provided with space for information which may be printed or embossed, including trademark graphics 18 and specific identification of the card holder and exam type, as indicated by reference character 20. Also present on the surface of central section 12 is security device 22, which, in the preferred embodiment, is of holographic configuration, to render duplication of the card extremely difficult. Lateral sections 14 and 16 include printed opposite test result indicators 24 and 26 respectively, in this embodiment depicted as the words "NEGATIVE" and "POSITIVE", and also associated explanatory legends 28 and 30, respectively. The lateral sections of the card are color coded so that, for example, the positive indication 24 and it's associated legend 28 appear on a red background 32, and the negative indication, 24 and legend 30 appear on a green background 34.

The lateral dimension of Card 10 from left edge 36 of section 32 to severance line B is approximately 3⅝ inches, with the same dimension applying to the distance from severance line A to the right edge 38 of right section 16. This is the same lateral dimension as a typical wallet-sized credit card.

Figure 3:
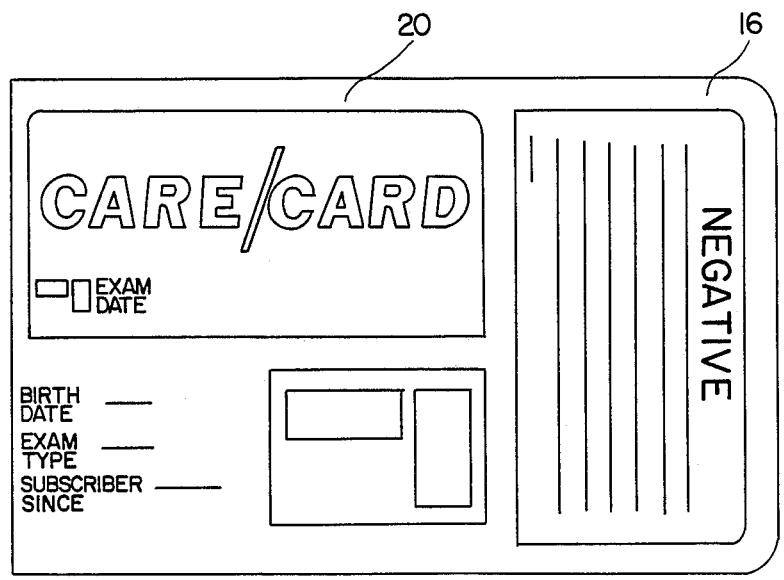
FIG. 3 is a front elevation of the card shown in FIG. 1 after activation to disclose medical information.

FIG. 2 illustrates one simple method of activating card 10 to record and disclose a medical test result. As shown, a physician, or a staff member under the direction of a physician, activates the card by severing either of the separable lateral sections 14 or 16 from the center section 12 by cutting along severance lines A or B. Thus, mutilation of card 10 in this manner records a result corresponding to the information conveyed by the remaining lateral section. The resulting card format is shown in FIG. 3 to record a negative result. The card shown in FIG. 3 indicates a negative test result on a card which measures approximately 2⅛ inches in height by 3⅝ inches in length, the dimension of a standard wallet-sized credit card. In this manner, all of the pertinent trademark graphics and patient identification is retained on central section 12, together with a color coded lateral test result section 16 in a form which is easily carried, color coded and visually recognizable. Explanatory legend 30, which remains in the card after activation conveys information as to the connotations of a negative result.

Figure 4:
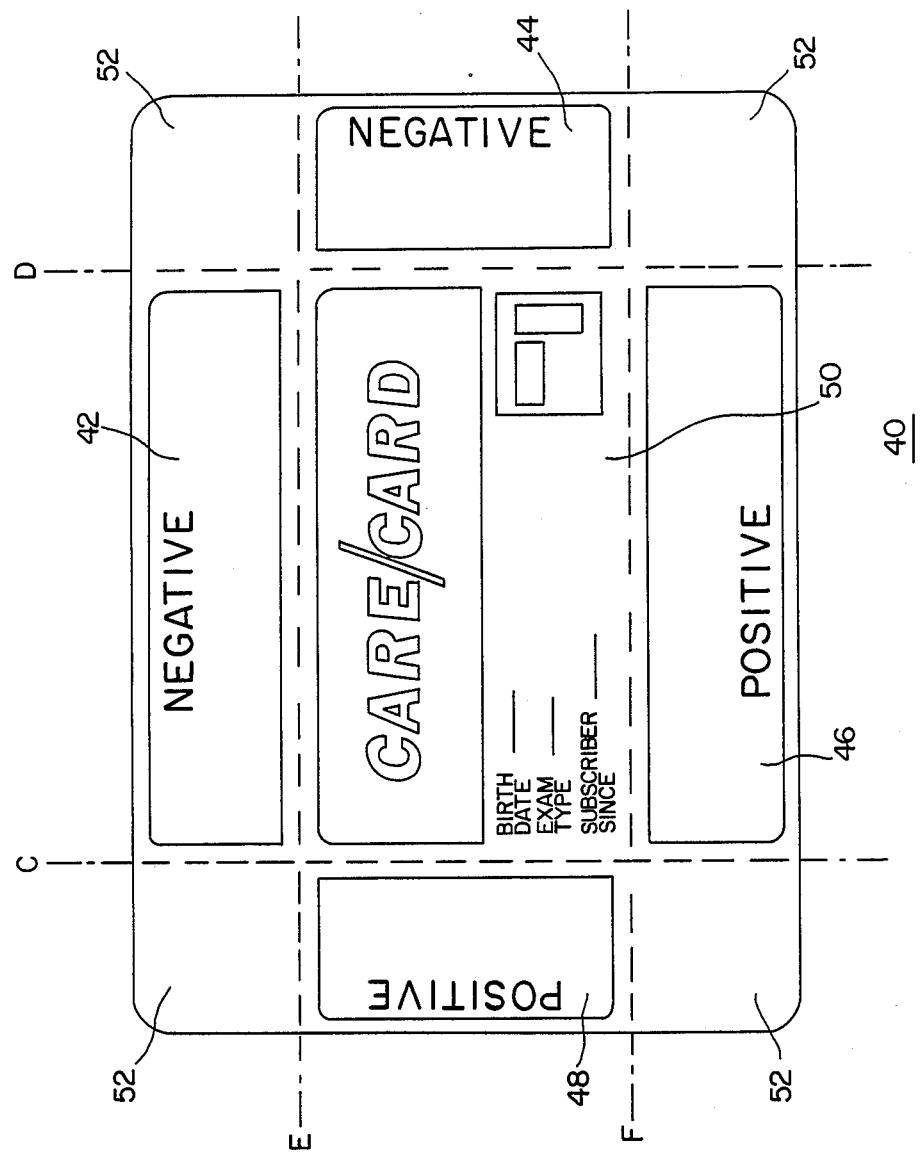
FIG. 4 is a front elevation of an alternative embodiment of the present invention.
Figure 5:
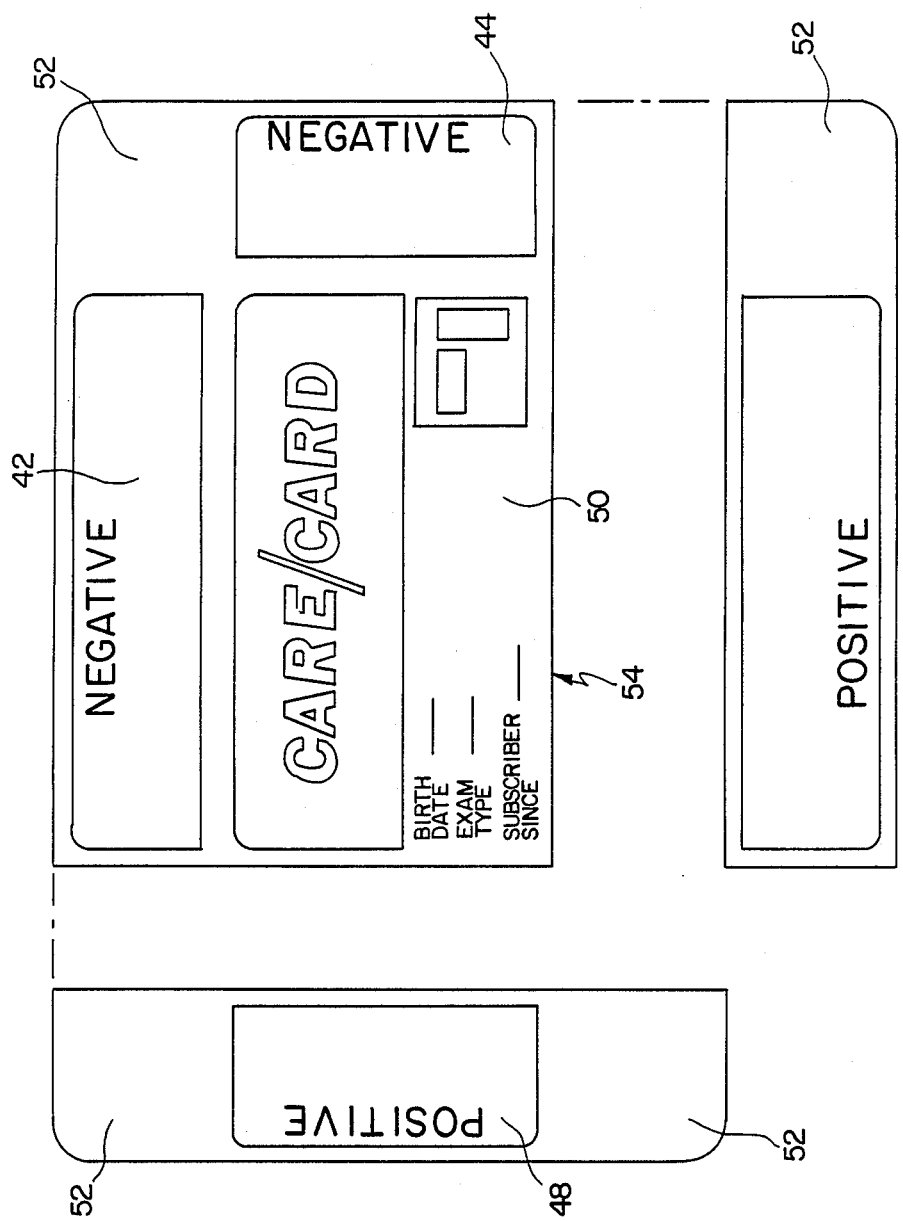
FIG. 5 is an exploded view of the card shown in FIG. 4 after it has been activated to disclose information.

An alternative embodiment of the invention is disclosed in FIGS. 4 and 5. In this embodiment, a card 40 is provided which is larger than a standard wallet-sized credit card in both length and width. This card is designed to record and disclose information which may be represented as a 2×2 matrix, as for example, an indication of antibody test results along one axis and a vaccination indication along the other axis.

Card 40 is provided with printed and color coded indicators 42, 44, 46 and 48 lying along the periphery of card 40, each of which is located along one side of card 40. Central section 50 contains the same printed and embossed information as central section 20 of the card illustrated in FIGS. 1-3.

Card 40 is activated by cutting the card along imaginary severance lines E and C, E and D, F and C, or F and D, to indicate negative/positive, positive/positive, negative/negative or positive/negative, respectively. In this manner four results may be encoded by the physician on a resulting wallet-sized card which is highly alteration resistant. When the card has been activated, it includes central section 50, two adjacent indicators of the four provided, 42, 44, 46 and 48, and the corner section 52 located between the two remaining adjacent indicators. The result of such an activation is illustrated in FIG. 5 showing a negative/negative result after the card has been activated by cutting it along severance lines F and C in FIG. 4.

The card 54 thus produced is substantially the same size and shape of the standard wallet-sized credit card and provides information in answer to more than one query.

In an alternative configuration of either of the embodiments illustrated in FIGS. 1-5, additional information may be encoded on card center sections 20 and 50, by punching one or more holes at specific locations in the center section or by other indelible marking procedures to indicate, for example, the number and type of tests administered to the patient.

A further embodiment is illustrated in FIG. 6 of the drawings, wherein pendant 56 is illustrated. Pendant 56 is provided with lateral result indicators 58 and 60 which flank center section 62. Defined within center section 52 is eyelet 64 which is adapted to receive chain 66, which may be either a neck chain or a bracelet or the like. Pendant 56 is activated in the same manner as card 20 to indicate a positive or negative result by cutting off the lateral indicators 60 or 58, respectively, leaving center section 62 and remaining indicator 58 or 60, respectively. The pendant may also have additional removable sections to provide additional information. This embodiment may be particularly useful for emergency medical identification in case of unconsciousness.

An example of the process for recording, reporting and disclosing medical information will be described with regard to the preferred embodiment of the card illustrated in the FIGS. 1 through 3. It is contemplated that three parties be involved in the reporting and recording and disclosure process embodying the present invention: a subscriber, a sponsor and a vendor.

The subscriber is the medical patient who submits to testing for a communicable disease, such as AIDS. The subscriber may also refer in other contexts to an employee seeking security clearance or other means of identification which can be determined in a binary fashion.

The sponsor is, in the preferred embodiment, a physician who orders a test for the subscriber and evaluates the data generated by that test to determine a result, typically positive or negative.

The vendor is the supplier of card 10 which is forwarded to the sponsor as applied for by the subscriber and the sponsor, with information recorded thereon identifying the subscriber and type and date of examination, while remaining neutral as to the result of the test.

In operation of the process embodying the present invention, the subscriber completes a written application requesting an examination and enrollment in the vendor's program. The application is then completed and signed by the physician, indicating certain physician identification information for security purposes. The application also includes the date of the test given to the subscriber so that this information can be encoded on the card.

After receiving the completed and signed application from the sponsoring physician, the vendor processes the application and returns to the sponsoring physician an encoded card 10 having both severable result sections 14 and 16 intact. In this manner, the vendor has information only that a test has been, or will be, administered to the subscriber. The vendor is not, however, privy to the results of any such tests since this is a matter of confidence between the physician and the physician's patient, and the decision to disclose the result of the test is left solely in the hands of the subscriber-patient.

The recording of the test results is performed by the physician or one of the physician's staff members under the physician's direction by cutting the cards along severance lines A or B as shown in FIG. 2. Since the card can only be activated by what amounts to mutilation of the card, the card is highly resistant to alteration once it has been activated. This element of the process provides a degree of credibility, reliability and security to the procedure.

The foregoing specifications describes only the embodiments of the invention shown and described. Other embodiments may be articulated as well. The terms and expressions used therefore serve only to describe the invention by example, and not to limit the invention. It is expected that others will perceive differences which, while differing from the foregoing, do not depart from the spirit and the scope of the invention here described and claimed.

What is claimed is:

1. A method of identifying an individual with a condition comprising the steps of:

producing an information recording and disclosing device comprising a card of unitary construction, including a center section and at least one pair of oppositely disposed disclosure sections whereby personal confidential subscriber information may be recorded by the removal of one of the disclosure sections so that the personal confidential subscriber information is indicated by the remaining disclosure section;

printing or embossing neutral information on the pair of disclosure sections one of which must relate to the individual's condition on said device, removing one disclosure section on said device to indicate the condition of the individual, and using said device by the individual to disclose said condition to others.

2. The method of claim 1 wherein said production and printing or embossing of said device is performed by a vendor.

3. The method of claim 1 wherein said device is transferred to said sponsor after printing or embossing.

4. The method of claim 3 wherein said removing of one disclosure section is performed by said sponsor.

5. The method of claim 4 wherein said device is transferred to a subscriber.

6. The method of claim 1 wherein said sponsor is a physician, said subscriber is a patient and said condition relates to the medical condition of the patient.

7. An information recording and disclosing device comprising a card of unitary construction which has at least three sections, including:

a first center section adapted to contain personal information and evaluation information, said first section having personal information indicia and evaluation indicia preprinted thereon;

at least two other sections which indicate differing results of the evaluation, at least a first of said sections having one result of the evaluation preprinted thereon, and at least a second of said sections having another result of the evaluation preprinted thereon, each of said sections being removable, whereby the removal of at least one of said sections indicates personal confidential subscriber information by irreversibly converting said card to indicate a single result of the evaluation.

8. An information recording and disclosing device as in claim 7 wherein each of said information disclosure sections bears an indication disclosing a desired piece of information.

9. An information recording and disclosing device as in claim 7 wherein each of said information disclosure sections bears an information legend explaining the desired piece of information.

10. An information recording and disclosing device as in claim 7 wherein each of said information disclosure sections is color coded so that said information is readily discernable.

11. An information recording and disclosing device as in claim 7 wherein said card is activated by the removal of at least one of a plurality of disclosure sections whereby said personal subscriber information is indicated on said card by the presence of at least one remaining disclosure section.

12. An information recording and disclosing device as in claim 11 wherein said card is a substantially rectangular card having a center section and a pair of lateral, severable, information disclosure sections, whereby the removal of one of said sections along a line separating said section from said center section results in a mutilated information reporting card of standard credit card size.

13. An information recording and disclosing device as in claim 11 wherein said card measures approximately 2⅛ inches by 3⅜ inches after activation by said sponsor.

14. An information recording and disclosing device as in claim 7 wherein said card is of substantially rectangular shape and includes two pairs of oppositely disposed information disclosure sections, each of said pairs including information disclosure indicators appearing at opposite sides of the face of said card.

15. An information recording and disclosing device as in claim 14 wherein removal of one section of each of said pairs of information disclosure sections results in a card having a rectangular shape.

16. An information recording and disclosing device as in claim 15 wherein removal of one section of each of said pairs of informtion disclosure sections results in a card 2⅛ inches by 3⅜ inches.

17. An information recording and disclosing device as in claim 7 including a holographic configuration imprinted on said center section thereof.

18. A method of reporting personal confidential subscriber and personal subscriber information comprising the steps of:

producing an information recording and disclosing device comprising a card of unitary construction, including a center section containing preprinted indicia and at least one pair of oppositely disposed disclosure sections whereby personal confidential subscriber information may be recorded by the removal of one of the disclosure sections so that the personal confidential subscriber information is indicated by the remaining disclosure section;

printing or embossing personal subscriber information and neutral information on said device, and removing one disclosure on said device to indicate personal confidential subscriber information.

19. The method of claim 18 wherein said production and printing or embossing of said device is performed by a vendor.

20. The method of claim 18 wherein said device is transferred to said sponsor after printing or embossing.

21. The method of claim 20 wherein said removing of one disclosure section is performed by said sponsor.

22. The method of claim 21 wherein said device is transferred to a subscriber.

23. The method of claim 18 wherein said sponsor is a physician, said subscriber is a patient and said personal subscriber information and personal confidential subscriber information relate to the medical condition of the patient.

* * * * *